(12) United States Patent
Shinzaki

(10) Patent No.: US 10,308,445 B2
(45) Date of Patent: Jun. 4, 2019

(54) SUBSTRATE PROCESSING DEVICE

(71) Applicant: SHARP KABUSHIKI KAISHA, Sakai, Osaka (JP)

(72) Inventor: Yohhei Shinzaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/115,335

(22) Filed: Aug. 28, 2018

(65) Prior Publication Data

US 2019/0071264 A1    Mar. 7, 2019

(30) Foreign Application Priority Data

Sep. 5, 2017    (JP) .................................. 2017-170137

(51) Int. Cl.
| | |
|---|---|
| *B65G 13/06* | (2006.01) |
| *B65G 49/05* | (2006.01) |
| *B65G 49/07* | (2006.01) |
| *F16C 13/02* | (2006.01) |
| *B65G 49/06* | (2006.01) |
| *F16C 13/00* | (2006.01) |

(52) U.S. Cl.
CPC .......... *B65G 49/064* (2013.01); *F16C 13/006* (2013.01); *F16C 13/02* (2013.01); *B65G 2249/02* (2013.01)

(58) Field of Classification Search
CPC ........ B65G 13/06; B65G 49/05; B65G 49/07; B65G 49/064; F16C 13/02; F16C 13/006
USPC .......... 198/493, 689.31, 780, 781.07; 193/37
See application file for complete search history.

(56) References Cited

U.S. PATENT DOCUMENTS

| | | | | |
|---|---|---|---|---|
| 2,773,433 | A * | 12/1956 | Mathias ..................... | D21F 1/50 162/373 |
| 3,701,412 | A * | 10/1972 | Wriedt .................... | B65G 13/00 198/689.1 |
| 6,264,743 | B1 * | 7/2001 | Cucuzza ................... | B05C 5/00 118/319 |
| 6,363,753 | B1 * | 4/2002 | Yoshizawa ............ | C03B 23/033 193/35 F |
| 6,450,313 | B1 * | 9/2002 | Janatka .................. | B65G 39/09 188/82.84 |

(Continued)

FOREIGN PATENT DOCUMENTS

JP    2014-040298 A    3/2014

OTHER PUBLICATIONS

US 2006/0219605 A1, Oct. 5, Devitt (Year: 2006).*

*Primary Examiner* — Douglas A Hess
(74) *Attorney, Agent, or Firm* — ScienBiziP, P.C.

(57) ABSTRACT

A substrate processing device includes shafts, rollers, a gas blowing unit, bearings, and s suction unit. The shafts include internal spaces and first through holes communicated with the internal spaces. The rollers are attached to the shafts to be rotatable about axes of the shafts for conveying a substrate. The gas blowing unit is configured to blow gas to the substrate carried by the rollers. The bearings support the shafts to be rotatable and include second through holes communicated with the first through holes of the shafts. The bearings include inner rings fitted on the shafts, outer rings opposed to outer peripheries of the inner rings, respectively, and rolling components disposed between the inner rings and the outer rings. The suction unit is configured to suck air in the internal spaces of the shafts.

7 Claims, 6 Drawing Sheets

(56) References Cited

U.S. PATENT DOCUMENTS

| | | | | |
|---|---|---|---|---|
| 7,077,019 B2* | 7/2006 | Weiss | B65G 49/061 | |
| | | | 73/865.8 | |
| 7,428,959 B2* | 9/2008 | Jung | B65G 49/063 | |
| | | | 198/493 | |
| 7,568,574 B2* | 8/2009 | Nagatomo | H01L 21/67784 | |
| | | | 198/493 | |
| 7,608,304 B2* | 10/2009 | Koyama | G02F 1/1333 | |
| | | | 118/72 | |
| 8,152,168 B2* | 4/2012 | Rossfeldt | B65H 29/6636 | |
| | | | 271/183 | |
| 8,511,461 B2* | 8/2013 | Kudva | B65G 49/061 | |
| | | | 198/493 | |
| 8,602,198 B2* | 12/2013 | Coenen | B65H 45/16 | |
| | | | 193/37 | |
| 8,672,323 B2* | 3/2014 | Blanchard | B41F 13/02 | |
| | | | 198/689.1 | |
| 8,939,445 B2* | 1/2015 | Schoultz | B65G 39/02 | |
| | | | 271/108 | |
| 9,981,810 B2* | 5/2018 | Dugat | B65G 47/54 | |

* cited by examiner

FIG.1
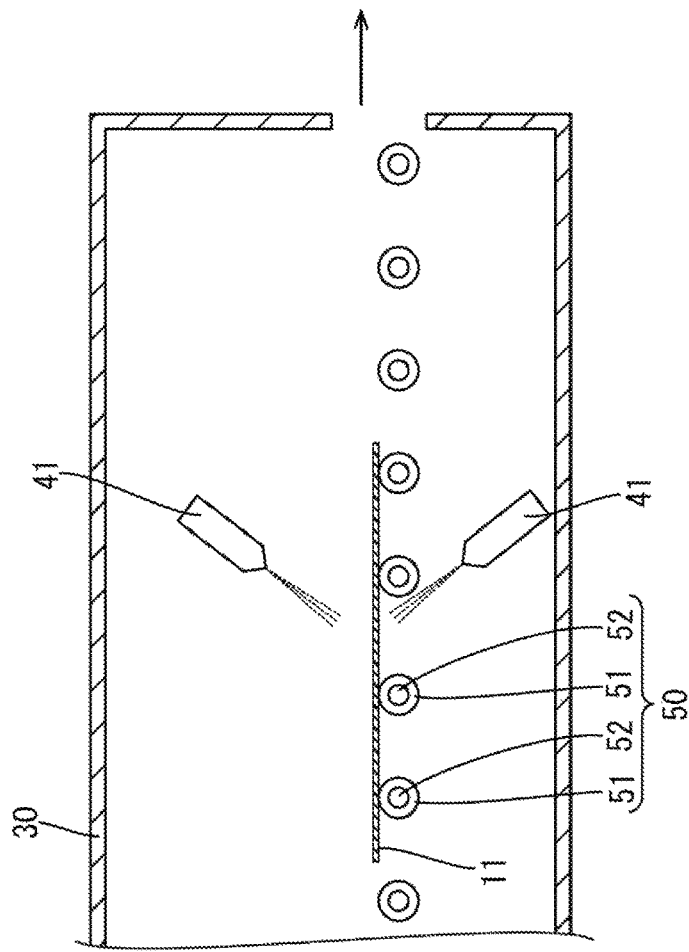
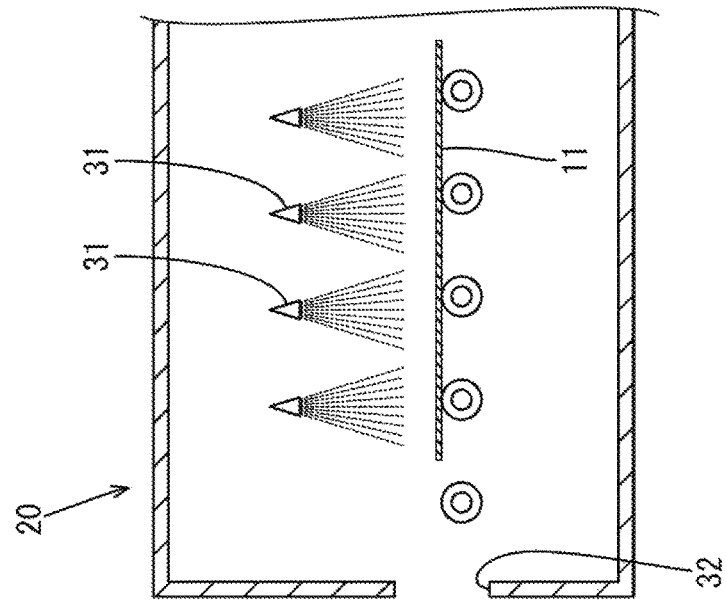

SUBSTRATE PROCESSING DEVICE

CROSS REFERENCE TO RELATED APPLICATION

This application claims priority from Japanese Patent Application No. 2017-170137 filed on Sep. 5, 2017. The entire contents of the priority application are incorporated herein by reference.

TECHNICAL FIELD

The present invention relates to a substrate processing device.

BACKGROUND

An example of a substrate processing device configured to process a substrate while the substrate travels on a conveyer is disclosed in Japanese Unexamined Patent Application Publication No. 2014-040298. The substrate processing device includes conveyer shafts on which conveying rollers for conveying the substrate are fitted. The conveyer shafts are supported by bearings to be rotatable. Air is blown to the substrate that travels on the conveyer as the conveying rollers rotate to remove a cleaning liquid on the substrate.

In the substrate processing device including the bearings, dust may be produced as the bearings rotate. When the air is blown to the substrate, the dust may scatter and adhere to the substrate.

SUMMARY

The technology disclosed herein was made in view of the above circumstances. An object is to provide a substrate processing device in which dust is less likely to adhere to a surface of a substrate.

A substrate processing device includes shafts, rollers, a gas blowing unit, bearings, and s suction unit. The shafts include internal spaces and first through holes communicated with the internal spaces. The rollers are attached to the shafts to be rotatable about axes of the shafts for conveying a substrate. The gas blowing unit is configured to blow gas to the substrate carried by the rollers. The bearings support the shafts to be rotatable and include second through holes communicated with the first through holes of the shafts. The bearings include inner rings fitted on the shafts, outer rings opposed to outer peripheries of the inner rings, respectively, and rolling components disposed between the inner rings and the outer rings. The suction unit is configured to suck air in the internal spaces of the shafts.

According to the configuration, if dust is produced at one of the bearings, the suction unit is turned on. The dust passes through the second through hole of the bearing, the first through hole that is communicated with the second through hole, and the internal space of the shaft on which the bearing is fitted, and then exits from the shaft through the opening of the shaft. Therefore, the dust is less likely to remain in the bearing 60. Namely, a problem relating to dust in the bearings is blown by the blasted air from the gas blowing unit and adheres to the surface of the substrate is less likely to occur. Furthermore, the exhaust passage has a simple configuration because the internal spaces of the shafts define sections of the exhaust passage.

According to the present technology, a substrate processing device in which dust is less likely to adhere to a surface of a substrate can be provided.

BRIEF DESCRIPTION OF THE DRAWINGS

FIG. 1 is a side view of a substrate cleaning device according to a first embodiment.

DETAILED DESCRIPTION

First Embodiment

Figure 2:
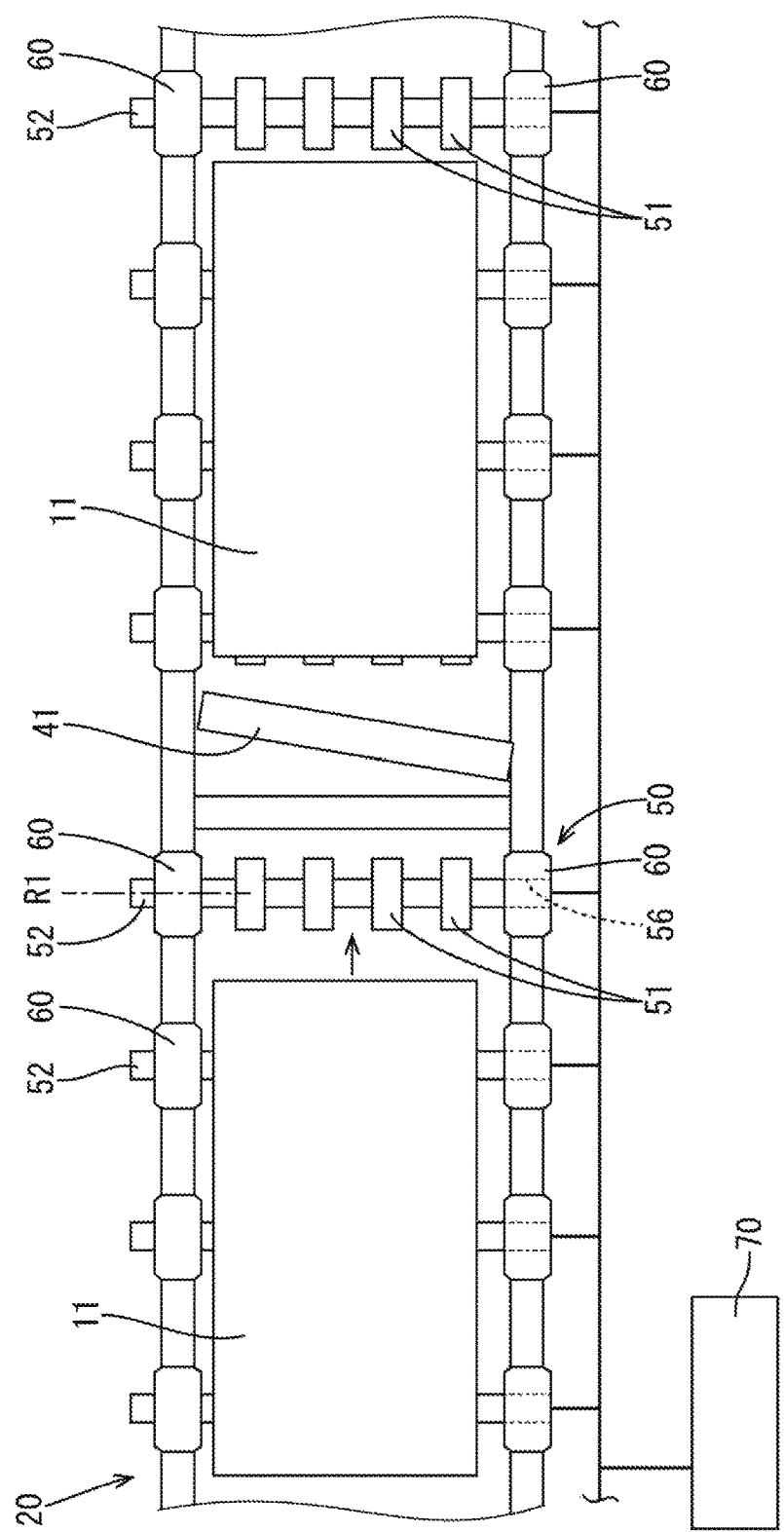
FIG. 2 is a plan view of the substrate cleaning device.

A first embodiment will be described with reference to FIGS. 1 to 5. In this section, a substrate cleaning device 20 (a substrate processing device) used in production of a substrate 11 to be included in a liquid crystal panel (a display panel) will be described. The substrate 11 is a glass substrate to be included in the liquid crystal panel. The substrate 11 may be used for a CF board or an array board to be included in the liquid crystal panel. The substrate cleaning device 20 is configured to apply a cleaning liquid to a surface of the substrate 11 to clean the surface of the substrate 11. As illustrated in FIG. 1, the substrate cleaning device 20 includes a processing tank 30 and a substrate conveyer 50 that conveys the substrate 11 in the processing tank 30. In the processing tank 30, a cleaning process is performed. The cleaning process includes application of the cleaning liquid to the surface of the substrate 11 to clean the surface of the substrate 11. The cleaning liquid includes but not limited to pure water or ultrapure water. The processing tank 30 includes nozzles 31 to spray the cleaning liquid on the substrate 11. In this embodiment, four nozzles 31 are disposed at intervals in a direction in which the substrate 11 travels. One of the nozzles 31 is located closer to an inlet 32 of the processing tank 30 and the other three of the nozzles 31 are arranged at intervals in a direction toward an outlet of the processing tank 30 (toward the right in FIG. 1).

The substrate cleaning device 20 further includes air knives 41 (an example of a gas blowing unit) configured to blow gas on a top surface and a back surface of the substrate 11 that is carried on the rollers 51 of the board conveyer 50. The air knives 41 are configured to discharge high-pressure air (compressed air) onto the surfaces of the substrate 11 to blow off the cleaning liquid on the substrate. Each of the air knives 41 is tilted relative to a traveling direction of the substrate 11 such that an air discharge port of each air knife 41 is located closer to the inlet 32 of the processing tank 30 in comparison to an opposite edge of each air knife 41 from the air discharge port. Furthermore, as illustrated in FIG. 2, a longitudinal direction of each air knife 41 is angled relative to the traveling direction of the substrate 11.

As illustrated in FIG. 2, the substrate conveyer 50 includes the rollers 51, the shafts 52, and the bearings 60. The rollers 51 are fitted on the shafts 52 for conveying the substrate 11. Multiple rollers 51 are fitted on each shaft 52 that has a tubular shape and a central axis that corresponds with a rotation axis R1 of the rollers 51. The bearings 60 support the shafts 52 to be rotatable. The shafts 52 and the bearings 60 are arranged in the traveling direction of the substrate 11. The shafts 52 are connected to a driver (e.g., a motor) and driven by the driver to rotate. As the shafts 52 rotate, the rollers 51 fitted on the shafts 52 rotate and thus the substrate 11 is carried on the rollers 51.

Figure 3:
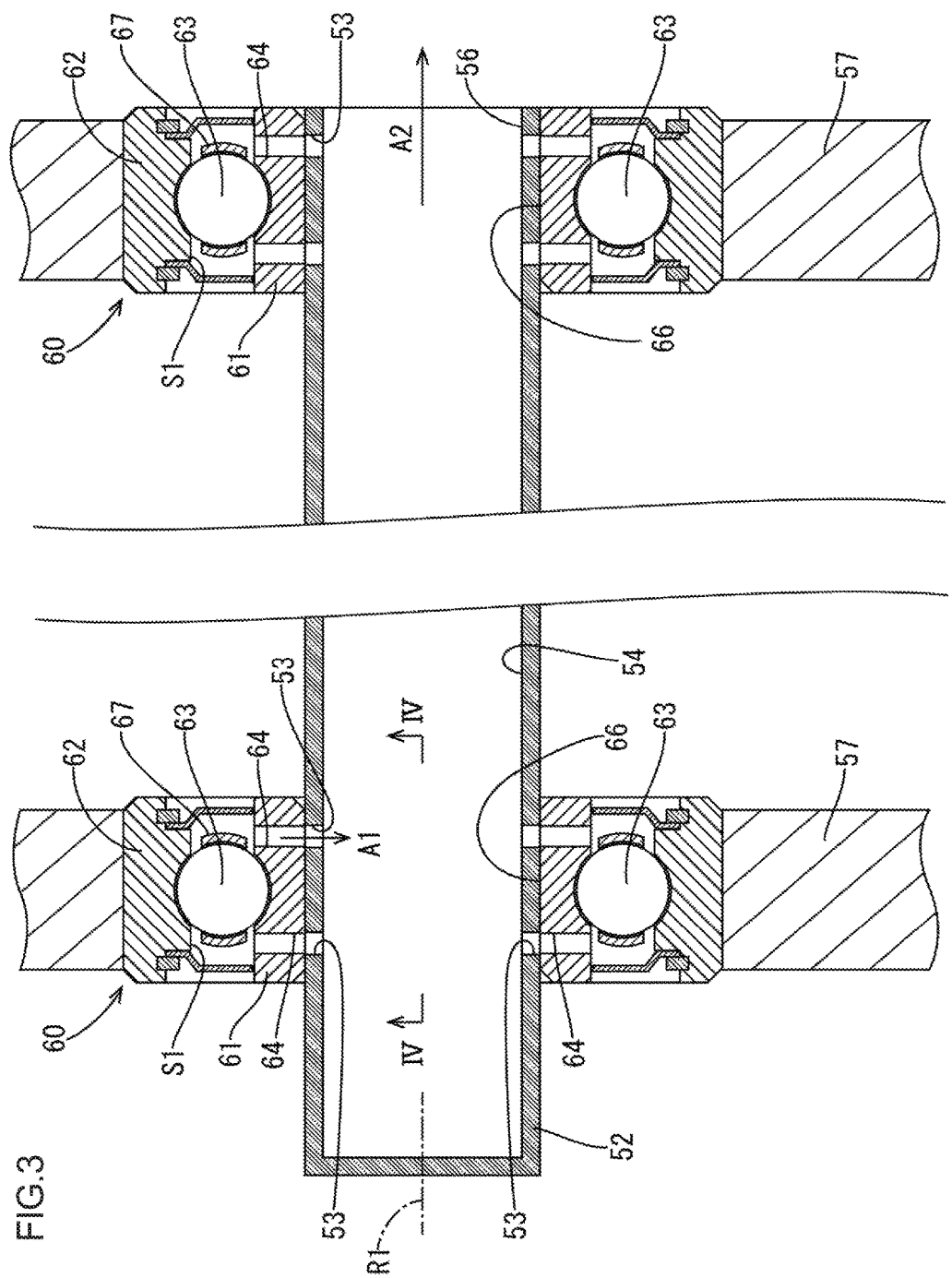
FIG. 3 is a cross-sectional view illustrating a shaft and bearings.

As illustrated in FIG. 3, the bearings 60 are disposed at ends of the shafts 52. The bearings 60 include inner rings 61 (inner races), outer rings 62 (outer races), rolling components 63 (e.g., balls and wheels), and holders 67. Each of the inner rings 61 has an annular shape. The inner rings 61 are fitted on peripheries of the shafts 52. The outer rings 62 are disposed on outer periphery sides of the respective inner rings 61. The rolling components 63 are disposed between the respective inner rings 61 and the respective outer rings 62. The holders 67 hold the rolling components 63 to be rollable. The outer rings 62 are fixed to bases 57 of the substrate conveyer 50 not to be rotatable. The inner rings 61 are fixed to the respective outer rings 62 to be rotatable via the rolling components 63. The shafts 52 are inserted in insertion holes 66 of the inner rings 61 and fixed to the inner rings 61 not to be rotatable relative to the inner rings 61. The shafts 52 are supported by the bearings 60 to be rotatable.

The shafts 52 include first through holes 53 at positions at which the bearings 60 are fitted. The first through holes 53 are communicated with an internal space 54 of the corresponding shaft 52. The inner rings 61 include second through holes 64 at positions corresponding with the first through holes 53, respectively. Therefore, a space S1 between each inner ring 61 and the corresponding outer ring 62 (in which the corresponding rolling component 63 is disposed) is communicated with the internal space 54 of the corresponding shaft 54 via the first through holes 53 and the second through holes 64. The first through hole 53 of each shaft 52 is located on either side of the corresponding rolling component 63 with respect to the longitudinal direction of the shaft 52. The second through hole 64 of each inner ring 61 is located on either side of the corresponding rolling component 63 with respect to the longitudinal direction of the shaft 52. A direction in which each first through hole 53 and the corresponding second through hole 64 extend corresponds with a radial direction of the corresponding shaft 52. The direction may be different from the radial direction of the shaft 52.

Figure 4A:
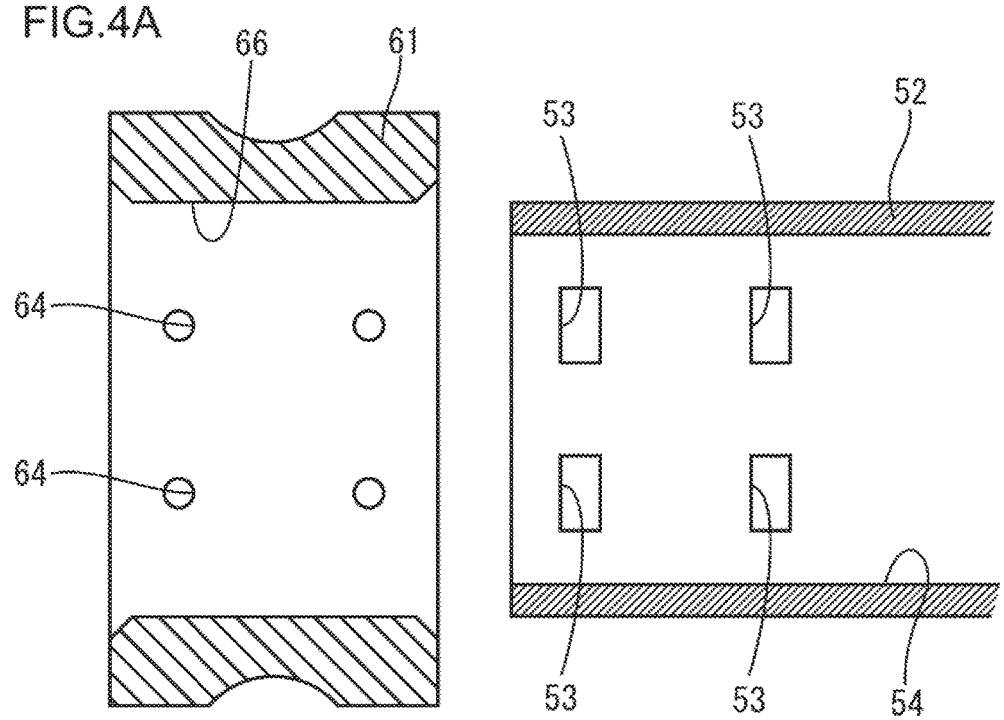
FIGS. 4A and 4B are cross-sectional views illustrating the shaft and an inner ring.
Figure 4B:
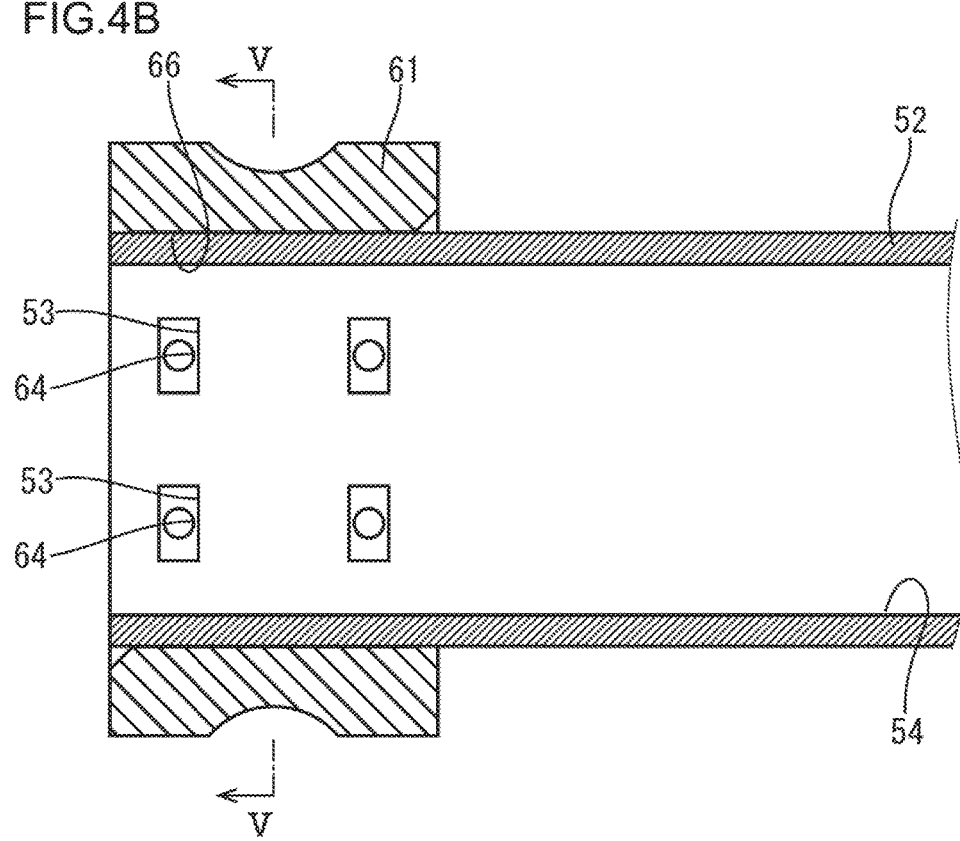

As illustrated in FIGS. 4A and 4B, the first through holes 53 and the second through holes 64 are arranged in the radial direction of the shaft 52 or the inner ring 61. Each first through hole 53 has a rectangular shape elongated in the circumferential direction of the shaft 52. Each second through hole 64 has a circular shape. An area of the first through hole 53 is larger than an area of the second through hole 64. In FIG. 4A, the inner ring 61 is removed from the shaft 52. In FIG. 4B, the inner ring 61 is fitted on the shaft 52.

Figure 5:
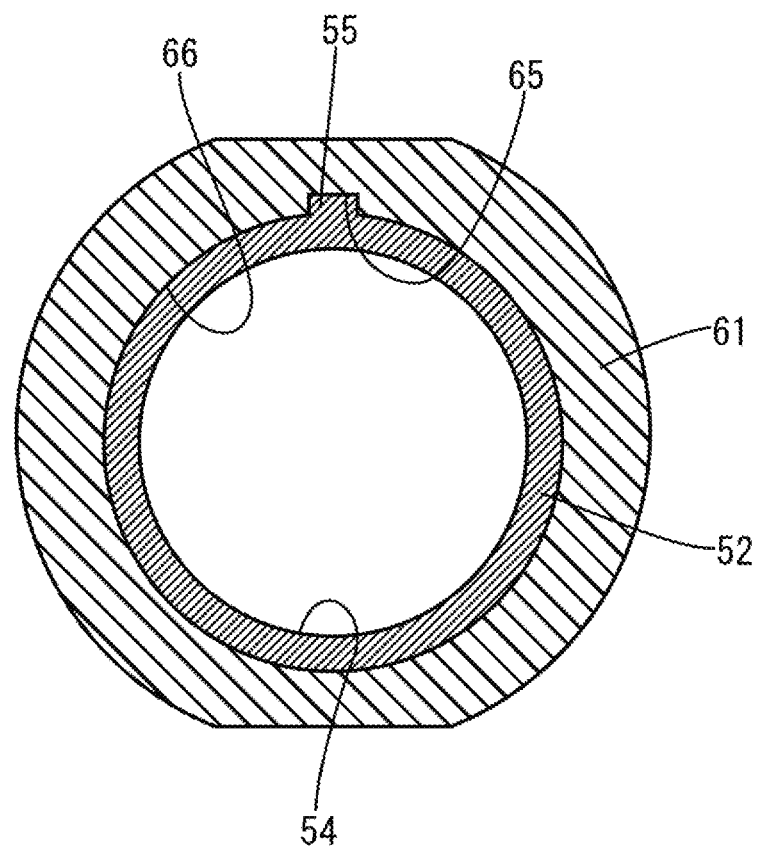
FIG. 5 is a cross-sectional view illustrating the shaft and the inner ring along line V-V in FIG. 4.

As illustrated in FIG. 5, the inner rings 61 include recesses 65 in inner peripheral surfaces and the shaft 52 include protrusions 55 on outer peripheral surfaces. The protrusions 55 are fitted in the recesses 65, respectively. As illustrated in FIG. 3, one of ends of each shaft 52 includes an opening 56 into the internal space 54 of the shaft 52. As illustrated in FIG. 2, the ends of the shafts 52 including the openings 56 are connected to a suction unit 70 that may be a vacuum pump. The suction unit 70 is disposed outside the processing tank 30.

Dust may be produced by friction between the rolling components 63 and the inner rings 61 (or the outer rings 62) of the bearings 60 as the shafts 52 rotate. The suction unit 70 is provided for removal of the dust. The substrate cleaning device 20 includes an exhaust passage defined by the second through holes 64 of the inner rings 61, the first through holes 53 of the shafts 52, the internal spaces 53 of the shafts 52, and the openings 56 of the shaft 52 to carry the dust out of the substrate conveyer 50. In FIG. 3, a section of the exhaust passage is indicated by arrow A1 and another section of the exhaust passage is indicated by arrow A2. The suction unit 70 is configured to apply a negative pressure to the exhaust passage when turned on to remove the dust.

When the suction unit is turned on, dust produced at one of the bearings 60 passes through the second through hole 64 of the bearing 60, the first through hole 53 that is communicated with the second through hole 64, and the internal space 54 of the shaft 52 on which the bearing 60 is fitted, and then exits from the shaft 52 through the opening 56 of the shaft 52. The dust may be removed from the processing tank 30. Therefore, the dust is less likely to remain in the bearing 60, especially in the space S1 in which the rolling component 63 is disposed. Namely, a problem relating to dust in the bearings 60 is blown by the blasted air from the air knives 41 and adheres to the surfaces of the substrate 11 is less likely to occur. Furthermore, the exhaust passage has a simple configuration because the internal spaces 54 of the shafts 52 define sections of the exhaust passage.

One of the ends of each shaft 52 including the opening 56 is connected to the suction unit 70. Therefore, the air in the internal space 54 of the shaft 52 is sucked by the suction unit 70 and thus dust in the internal space 54 of the shaft 52 can be removed from the internal space 54 to the outside of the shaft 52. Furthermore, two bearings 60 are attached to each shaft 52, that is, a single shaft 52 provides the section of the exhaust passage for two bearings 60. Dust in the one of the bearings 60 fitted on the corresponding shaft 52 and dust in the other bearing 60 can be both sucked through the opening 56 of the shaft 52.

The second through holes 64 of each bearing 60 are located at positions corresponding to sides of the rolling component 63 such that the rolling component 63 is between the second through holes 64 with respect to the longitudinal direction of the shaft 52. Therefore, dust produced by friction between the rolling component 63 and the inner ring 61 or the outer ring 62 travels through any one of the through holes 63 and reaches the internal space 54 of the shaft 52. In comparison to a configuration in which only one through hole 64 is provided at a position lateral to the rolling component 63 with respect to the longitudinal direction of the shaft 52, the dust is more properly passed to the internal space 54 of the shaft 52.

Each first through hole 53 has a cross-sectional area greater than that of each second through hole 64. According to the configuration, even if alignment errors occur between the inner rings 61 and the corresponding shafts 52 and the second through holes 64 are slightly displaced from the respective first through holes 52, the second through holes 64 is properly communicated with the respective first through holes 53.

The shafts 52 include the protrusions 55 that are fitted in the respective recesses 65 of the inner rings 61. With the protrusions 55 fitted in the respective recesses 65, alignment errors are less likely to occur between the inner rings 61 and the corresponding shafts 52. Therefore, the second through holes 64 can be properly communicated with the respective first through holes 53.

Second Embodiment

Figure 6:
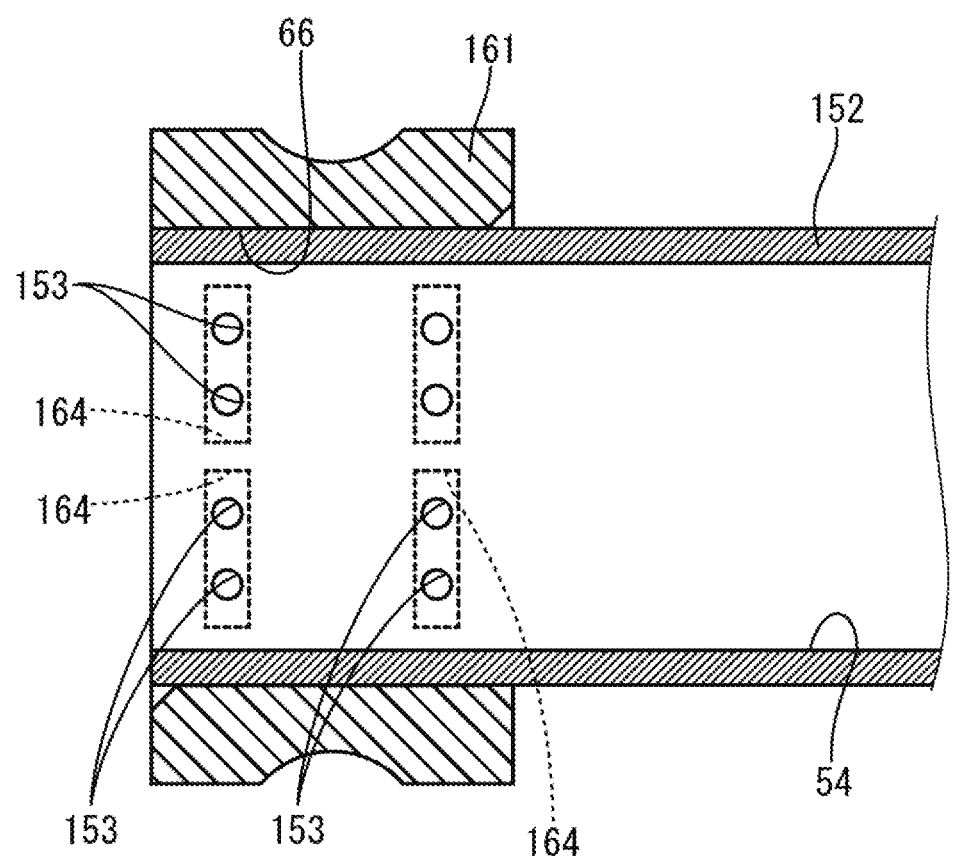
FIG. 6 is a cross-sectional view illustrating a shaft and an inner ring according to a second embodiment.

A second embodiment will be described with reference to FIG. 6. Components and portions having the same configuration as those of the first embodiment will be indicated by the same reference symbols and will not be described. As illustrated in FIG. 6, the second embodiment includes shafts 152 each including first through holes 153, each of which has a circular shape. The second embodiment further includes inner rings 161 each including second through holes 164 that are elongated in a circumferential direction of the inner rings 161. Two first through holes 153 arranged in a circumferential direction of the shaft 152 are opposed to a single second hole 164. According to the configuration, even if alignment errors occur between the inner rings 161 and the corresponding shafts 152, the first through holes 153 can be properly communicated with the corresponding second through holes 164.

Other Embodiments

The technology disclosed herein is not limited to the embodiments described above and illustrated by the drawings. For example, the following embodiments will be included in the technical scope.

(1) In the above embodiment sections, the substrate cleaning devices are described. However, the substrate processing device is not limited to the substrate cleaning devices. Any substrate processing devices configured to discharge gas onto substrates while the substrates are traveling on conveyers are included in the technical scope. A wet-etching device configured to wet-etch substrates is an example of the board processing device. The wet-etching device may be configured to remove an etching solution by air knives.

(2) The shapes, the number, and the arrangement of the first through holes and the second through holes can be altered from those of the above embodiments where appropriate.

(3) The gas blowing unit is not limited to the air knives. Any devices configured to discharge gas onto substrates are included in the technical scope.

(4) In the above embodiment sections, the inner rings 61 include the recesses 65 and the shafts 52 include the protrusions 55 protruding from the outer peripheries of the shafts 52. However, the inner rings 61 may include protrusions and the shafts 52 may include recesses.

(5) The substrate is not limited to the one that included in the liquid crystal panel (or the display panel).

The invention claimed is:

1. A substrate processing device comprising:
Shafts including internal spaces and first through holes communicated with the internal spaces;
Rollers attached to the shafts to be rotatable about axes of the shafts for conveying a substrate;
a gas blowing unit configured to blow gas to the substrate carried by the rollers;
bearings supporting the shafts to be rotatable and including second through holes communicated with the first through holes of the shafts, the bearings including inner rings fitted on the shafts, outer rings opposed to outer peripheries of the inner rings, respectively, and rolling components disposed between the inner rings and the outer rings; and
a suction unit configured to suck air in the internal spaces of the shafts.

2. The substrate processing device according to claim 1, wherein
each of the shafts includes an opening into one of the internal spaces included in the each of the shafts, and the opening is located at an end of the each of the shafts.

3. The substrate processing device according to claim 1, wherein each of the bearings includes two of the second through holes at positions corresponding to sides of corresponding one of the rolling components with respect to the longitudinal direction of the shafts.

4. The substrate processing device according to claim 1, wherein each of the first through hole has a cross-sectional area greater than that of each of the second through holes.

5. The substrate processing device according to claim 1, wherein at least two first through holes are communicated with each of the second through holes.

6. The substrate processing device according to claim 1, wherein
the inner rings include recesses, and
the shafts include protrusions fitted in the recesses of the respective inner rings.

7. The substrate processing device according to claim 1, wherein
the shafts include recesses, and
the inner rings include protrusions fitted in the recesses of the respective shafts.

* * * * *